(12) United States Patent
Charest et al.

(10) Patent No.: US 6,186,275 B1
(45) Date of Patent: Feb. 13, 2001

(54) BASKET TRANSPORTABLE BY HELICOPTER FOR USE ON ELEVATED CABLES OR INSTALLATIONS

(75) Inventors: Marc Charest, Brossard; Yves Despois, Vaudreuill-Dorion, both of (CA)

(73) Assignee: Les Hélicoptères Canadiens Limitée, Les Cédres (CA)

( * ) Notice: Under 35 U.S.C. 154(b), the term of this patent shall be extended for 0 days.

(21) Appl. No.: 09/369,177

(22) Filed: Aug. 6, 1999

(51) Int. Cl.[7] .................................................... E04G 3/00
(52) U.S. Cl. ............................................ 182/150; 182/142
(58) Field of Search .................................... 182/150, 138, 182/142, 10, 11; 244/137.1; 220/8

(56) References Cited

U.S. PATENT DOCUMENTS

| | | | |
|---|---|---|---|
| 440,045 | * | 11/1890 | Lewis ....................................... 182/10 |
| 864,405 | * | 8/1907 | Bowen .................................... 182/10 |
| 2,827,004 | * | 3/1958 | Luce . | |
| 2,992,440 | * | 7/1961 | Revolt . | |
| 4,422,528 | | 12/1983 | Patterson . | |
| 4,478,312 | | 10/1984 | Kurtgis . | |
| 4,724,976 | * | 2/1988 | Lee ............................................ 220/8 |
| 5,184,743 | * | 2/1993 | Suzuki ...................................... 220/8 |
| 5,297,654 | * | 3/1994 | De Parny .............................. 182/142 |
| 5,328,133 | | 7/1994 | Charest et al. . | |

FOREIGN PATENT DOCUMENTS

| | | | |
|---|---|---|---|
| 2055639 | | 5/1992 | (CA) . |
| 257099 | * | 6/1988 | (DE) ..................................... 182/150 |

* cited by examiner

Primary Examiner—Alvin Chin-Shue
(74) Attorney, Agent, or Firm—Swabey Ogilvy Renault Michel Sofia

(57) ABSTRACT

A basket removably attachable to a support arm extending laterally outwardly from a helicopter, comprises a frame structure having a bottom support surface and a top surface joined together in an axially adjustable relationship. An opening is defined in the top surface of the frame structure for providing access to the bottom support surface. The frame structure is displaceable between collapsed and erected positions for selectively reducing and increasing its height, whereby the basket can be carried in its collapsed position and, once on site, extended to its erected position for safely receiving at least one operator.

14 Claims, 3 Drawing Sheets

BASKET TRANSPORTABLE BY HELICOPTER FOR USE ON ELEVATED CABLES OR INSTALLATIONS

BACKGROUND OF THE INVENTION

1. Field of the Invention

The present invention relates to the servicing of elevated cables or installations, such as high voltage power lines and, more particularly, pertains to a new basket structure suited for supporting workmen during servicing operations.

2. Description of the Prior Art

Over the years, various helicopter portable basket structures have been developed for servicing elevated cables or installations, such as high voltage power transmission lines. For instance, U.S. Pat. No. 4,478,312 issued on Oct. 23, 1984 to Kurtgis, U.S. Pat. No. 4,422,528 issued on Dec. 27, 1983 to Patterson and Canadian Patent laid-open application No. 2,055,639 filed on Nov. 15, 1991 in the names of De Forges de Parny et al. all disclose a basket structure suspended on rope slings from a helicopter by means of an appropriate lifting harness system. Such arrangements, wherein the basket structure is supported underneath the helicopter, suffer from several disadvantages. For instance, in the case of a malfunctioning of the helicopter implying an emergency landing, the basket structure has to be dropped to permit landing of the helicopter. Furthermore, when the basket structure is disposed at the end of downwardly depending slings as mentioned hereinbefore, the helicopter pilot is not in a position to accurately assess the position of the basket structure, thereby rendering the installation thereof on elevated cables quite arduous and time consuming.

Accordingly, attempts have been made to overcome the above mentioned drawbacks. For example, U.S. Pat. No. 5,328,133 issued on Jul. 12, 1994 to Charest et al. discloses a basket structure which is removably mounted at one end of a support arm extending laterally outwardly of a helicopter.

Although the system described in the above mentioned patent constitutes an improvement over previously known helicopter basket carrying systems, it has been found that there is a need for a new basket structure adapted to be carried in a compact manner by a helicopter in order to provide additional clearance to the rotor blades of the helicopter, while still providing the required clearance above ground level during take-off and landing operations.

SUMMARY OF THE INVENTION

It is therefore an aim of the present invention to provide a basket adapted to be transported in a compact manner laterally outwardly of a helicopter.

It is also an aim of the present invention to provide a basket adapted to be traversed over obstacles depending from elevated cables.

It is a further aim of the present invention to provide a basket which is relatively easily installable on elevated cables.

Therefore, in accordance with the present invention, there is provided a basket adapted for attachment to a support arm extending laterally outwardly from a helicopter used to carry the basket to elevated cables or installations, comprising a container structure having a bottom support surface and an open top end for providing access to the bottom support surface, the container structure being displaceable between a collapsed position wherein the container structure has a reduced height and an erected position wherein the container structure has a full height.

In accordance with another general aspect of the present invention, there is provided a basket adapted for attachment to a support arm extending laterally outwardly from a helicopter, comprising a frame structure having a bottom support surface and a top surface joined together in an axially adjustable relationship, the top surface defining an opening for providing access to the bottom support surface, the frame structure being displaceable between collapsed and erected positions for selectively reducing and increasing axial dimensions thereof, whereby the basket can be carried in the collapsed position and, once on site, extended to the erected position for safely receiving at least one operator.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
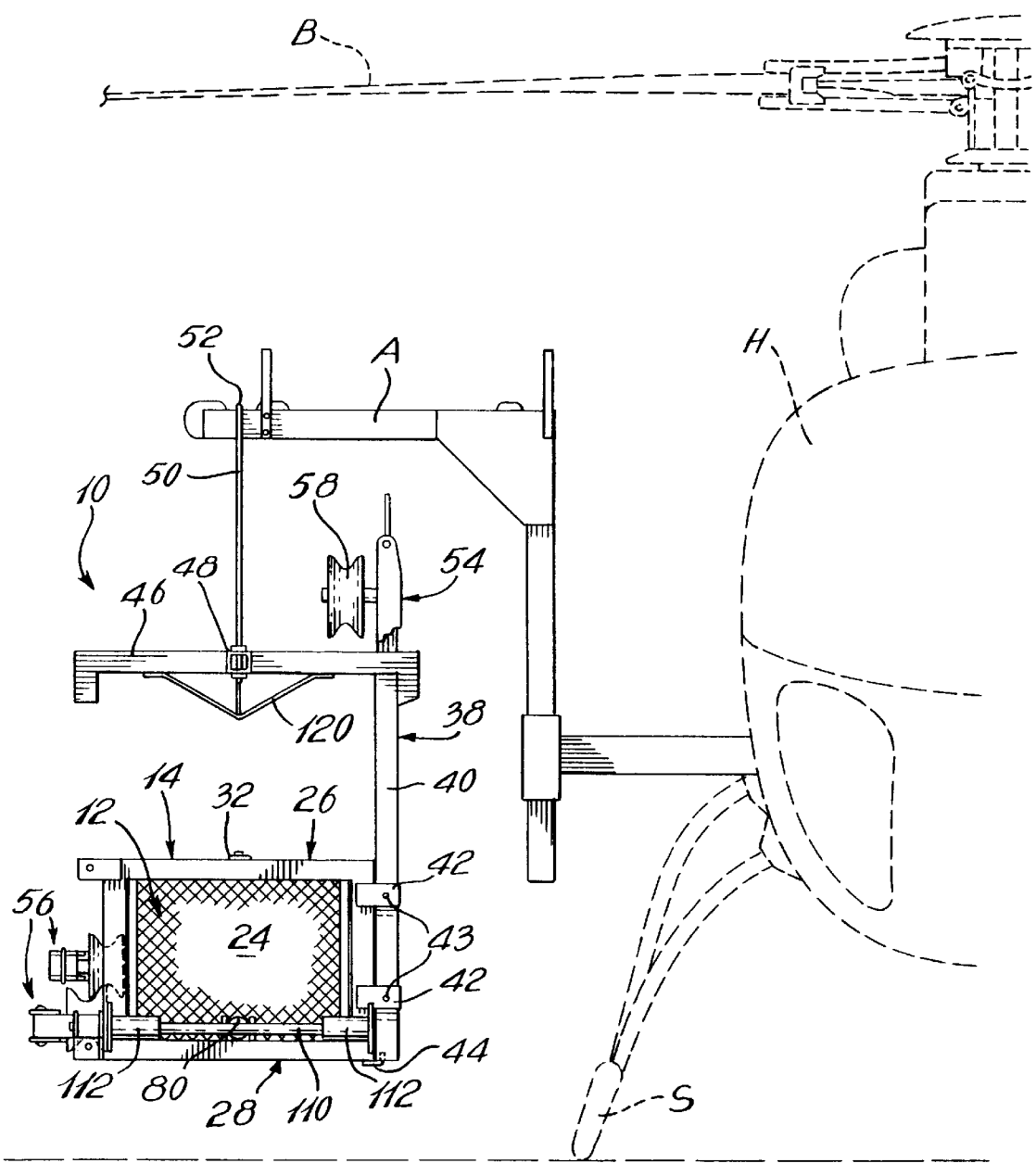
FIG. 1 is an end elevational view of a collapsible basket structure removably mounted at one end of a support arm extending laterally outwardly from a helicopter in accordance with a first embodiment of the present invention.

Now referring to the drawings, there is shown a collapsible basket structure 10 adapted to be detachably mounted at the end of a support arm A extending laterally outwardly of a helicopter H used to carry the collapsible basket 10 to and away from elevated installations, such as high voltage lines.

The collapsible basket 10 generally comprises a rectangular inner framework 12 adapted to be slidably received in a telescopic fashion within an associated rectangular outer framework 14. It is understood that the external dimensions of the inner framework 12 are slightly less than the internal dimensions of the outer framework 14.

Figure 2:
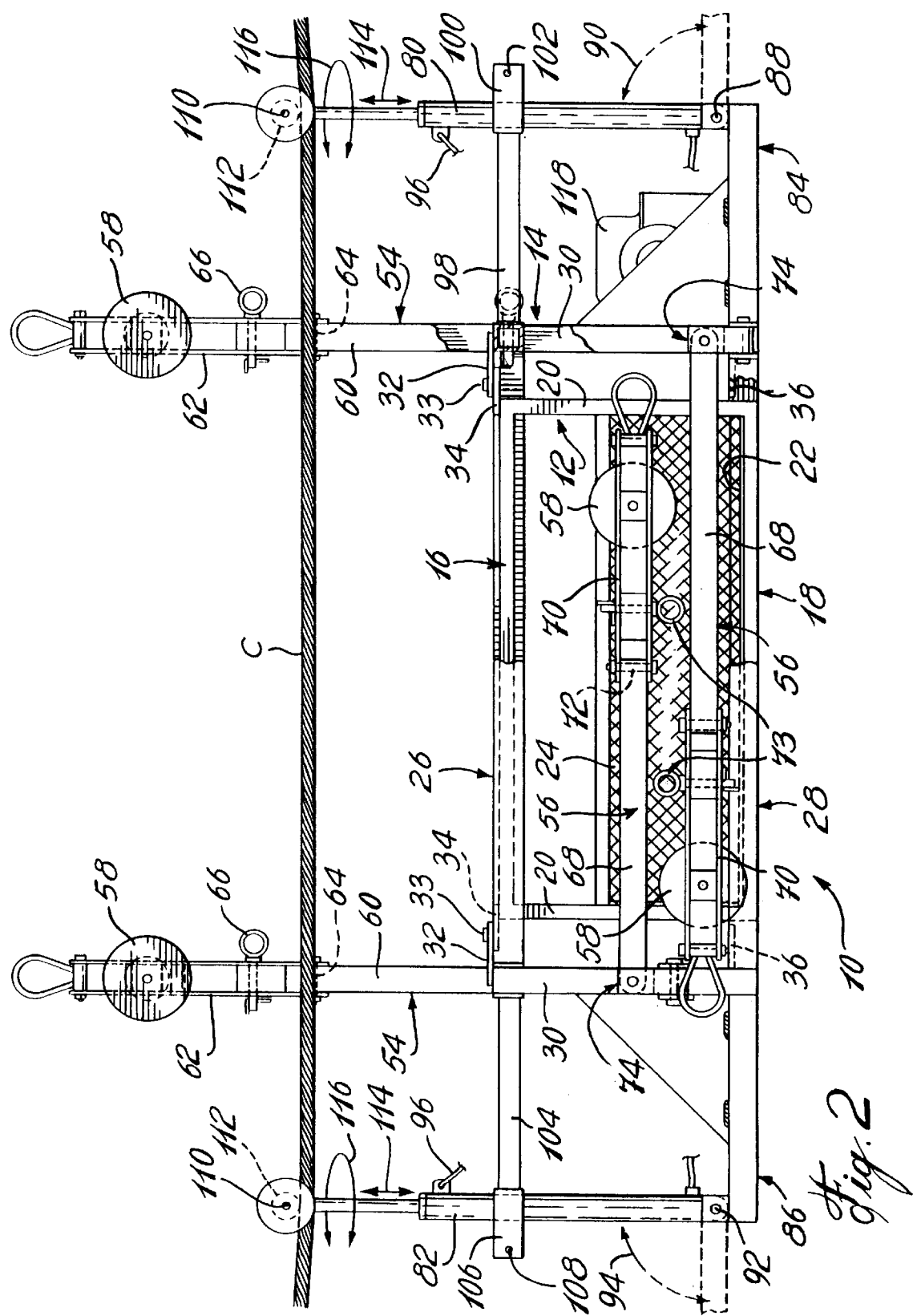
FIG. 2 is a side elevational view of the collapsible basket structure illustrated in a collapsed position thereof and temporarily supported on a pair of laterally spaced-apart parallel elevated cables by means of a pair of front and rear articulated extendable and retractable support arms.
Figure 3:
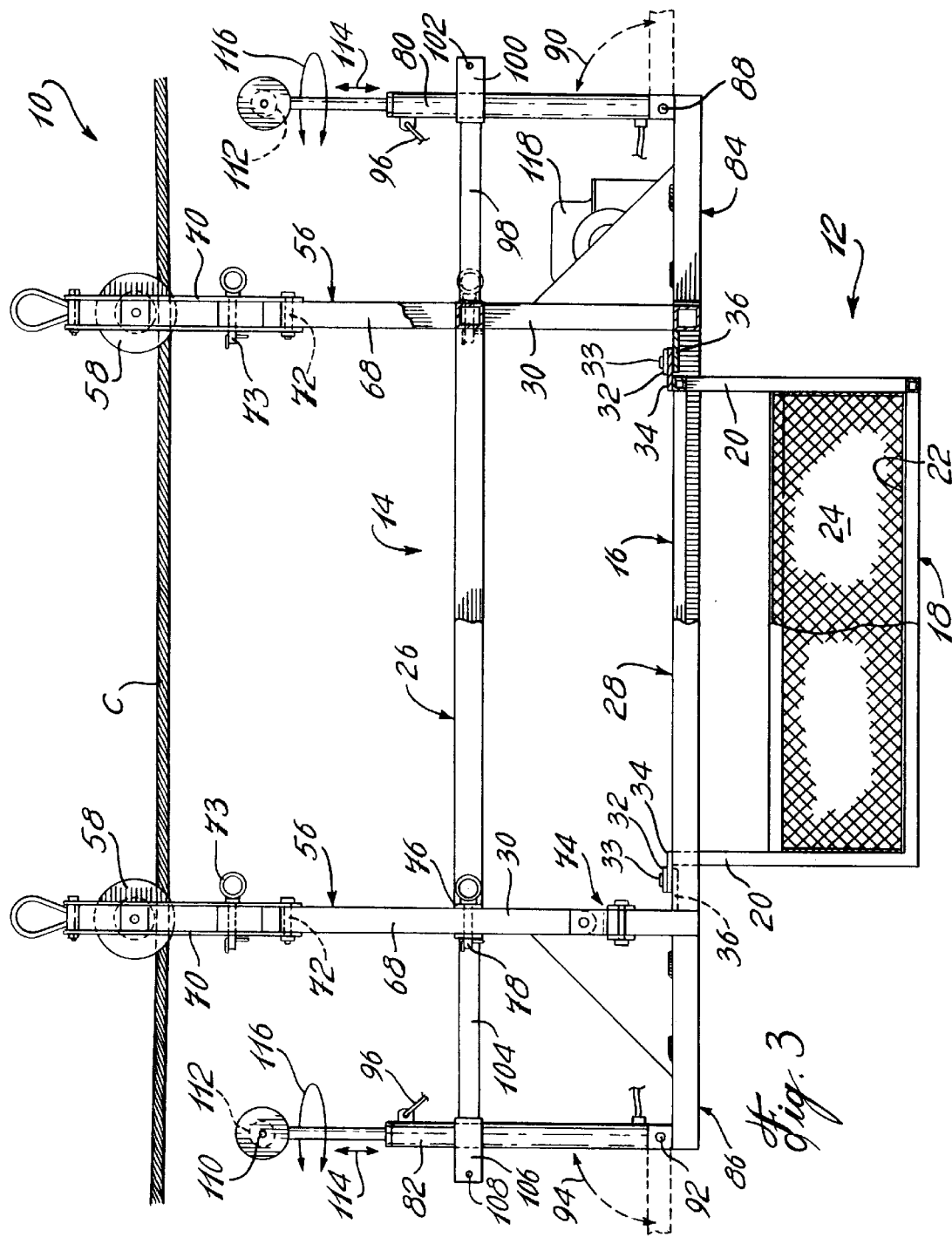
FIG. 3 is a side elevational view of the collapsible basket structure shown in an erected position thereof and supported on the elevated cables by means of four railway wheel support arms.

As seen in FIGS. 2 and 3, the inner framework 12 includes a rectangular top frame structure 16 and a rectangular bottom frame structure 18 rigidly interconnected to each other through four upstanding corner posts 20. A rectangular floor or bottom support surface 22 is mounted to the bottom frame structure 18. The bottom support surface 22 is preferably made of a corrugated plate of rigid material. Protective grids 24 are provided about the perimeter of the inner framework 12 to prevent equipment from falling out from the inside of the inner framework 12.

Similarly, the outer framework 14 is provided with rectangular top and bottom frame structures 26 and 28 rigidly joined by four upstanding corner posts 30. The top frame structure 26 defines a rectangular top opening to provide access to the bottom support surface 22 of the inner framework 12, whereas the bottom frame structure 28 defines a rectangular bottom opening which is slightly greater than the external rectangle formed by the upstanding corner posts 20 of the inner framework 12, thereby allowing the inner framework 12 to be selectively vertically moved into and out of the outer framework 14 through the rectangular bottom opening thereof.

All the parts of the bottom and outer frameworks 12 and 14 are preferably made of welded metallic tubing and plates.

As seen in FIGS. 1 and 2, the collapsible basket 10 can be locked in a collapsed position wherein the inner framework 12 is retracted within the outer framework 14 and held in place by means of a pair of opposed catch members 32 extending respectively frontwardly and rearwardly from the top frame structure 16 of the inner framework 12 for engaging subjacent portions of the top surface of the top frame structure 26 of the outer framework 14. Each catch member 32 consists of a rigid flat plate pivotally mounted at 33 on the top surface of a cross flange member 34 forming part of the top frame structure 16 of the inner framework 12.

the collapsible basket 10 can be readily unlocked from its collapsed position by manually pivoting the catch members 32 to an idle position (see FIG. 3) wherein the catch members 32 extend in a generally crosswise direction relative to the collapsible basket 10 so as to overly respective flange members 34, thereby clearing the top surface of the top frame structure 26. This operation may be facilitated by previously slightly lifting the inner framework 12 so as to elevate the catch members 32 above the top surface of the top frame structure 26 in order to eliminate the friction forces which are induced when the catch members 32 are rotated while still being in contact with the subjacent portions of the top frame structure 26 of the outer framework 14. The inner framework 12 can be manually lifted via a rope or handle (not shown) attached to the bottom support surface 22.

Once the catch members 32 have been pivoted inwardly to their respective idle positions, as described hereinbefore, the collapsible basket 10 can be displaced to an erected position thereof for the purpose of safely receiving at least one workman therein. This is achieved by lowering the inner framework 12 to an extended position wherein the inner framework 12 depends downwardly from the outer framework 14, as seen in FIG. 3.

A pair of opposed inner shoulders 36 extend respectively along the front inner surface and the rear inner surface of the rectangular bottom frame structure 28 of the outer framework 14 to form a resting surface against which the undersurface of corresponding flange members 34 may rest to retain the inner framework 12 in its lowered suspended position relative to the outer framework 14.

As seen in FIG. 1, the collapsible basket 10 is locked in its collapsed position when installed at the end of the support arm A of the helicopter H. This advantageously provides additional clearance between the basket 10 and the rotor blades B of the helicopter H, while still providing the clearance between the skids S of the helicopter H and the undersurface of the basket 10 which is required to ensure that the basket 10 will not interfere with the landing of the helicopter H. Indeed, the bottom of the basket 10 has to be at a higher elevation than that of the skids S so that the helicopter may land at any time while still carrying the collapsible basket 10. The additional clearance obtained between the rotor blades B and the collapsible basket 10 facilitates the manoeuvres which the helicopter pilot has to accomplish in order to place the basket 10, for instance, under a pair of laterally spaced-apart parallel cables C so that the basket 10 can be subsequently suspended therefrom as will be explained hereinafter. This operation necessitates that the helicopter H be displaced sideways towards the cables C with the rotor blades B being disposed above the cables C and the collapsible basket 10 thereunder, whereby it is extremely advantageous to be able to maximize the spacing between the top of the collapsible basket 10 and the rotor blades B. By using a collapsible basket in accordance with the present invention, it becomes possible to anchor the basket at a lower level with respect to the helicopter H, thereby providing additional clearance between the basket and the rotor blade B, while still maintaining the required clearance between the basket and the skids S of the helicopter H.

As seen in FIG. 1, the collapsible basket 10 is detachably mounted to the support arm A of the helicopter H via an inverted L-shaped support member 38 detachably secured to a helicopter side of the outer framework 14. The inverted L-shaped support member 38 includes an elongated vertical tubular portion 40 adapted to be slidably inserted within a pair of vertically aligned U-shaped brackets 42 extending laterally outwardly from the helicopter side of the outer framework 14. According to one embodiment of the present invention, one U-shaped bracket 42 is secured to the top frame structure 26 and the other to the bottom frame structure 28 with both U-shaped brackets 42 being located midway between the front and rear ends of the collapsible basket 10. A lock pin 43 is transversely inserted through each U-shaped bracket 42 and through the vertical tubular portion 40 of the inverted L-shaped support member 38 to prevent axial removal of the latter from the U-shaped brackets 38. A hook 44 is aligned with the U-shaped brackets 42 and extends laterally outwardly from an undersurface of the bottom frame structure 28 of the outer framework 14 for engagement within the open bottom end of the elongated vertical tubular portion 40 of the inverted L-shaped support member 38 to prevent the same from pivoting outwardly away from the helicopter side of the outer framework 14.

The inverted L-shaped support member 38 further includes a horizontal tubular portion 46 to which a cross member 48 is welded or otherwise secured so as to extend generally in the longitudinal plane of symmetry of the collapsible basket 10. A carrying member 50 having a generally inverted V-shaped configuration is secured at opposed lower ends thereof to respective opposed end portions of the cross member 48. A channel (not shown) extending in a direction parallel to the horizontal tubular portion 46 of the inverted L-shaped support member 38 and having a square or rectangular cross-section is defined at an apex 52 of the inverted V-shaped carrying member 50. The channel is opened towards the bottom so that the carrying member 50 may be suspended in a stable manner on the support arm A of the helicopter H so as to prevent rotational movement of the collapsible basket 10 about the support arm A. Furthermore, it is pointed out that the apex 52 of the carrying member 50 is substantially in vertical alignment with the center of gravity of the collapsible basket 10 to further improve the stability of the basket 10 during transportation. Abutments (not shown) are provided on the support arm A to prevent linear movement of the basket 10 along the support arm A.

The collapsible basket 10 further comprises two pairs of railway wheel support arms 54 and 56 disposed on respective opposed sides of the outer framework 14 for carrying railway wheels 58 rotatably mounted thereon. The wheels 58 may be motorized or not and are configured and disposed to ride over a pair of laterally spaced-apart parallel elevated cables C, as seen in FIG. 3.

The first pair of railway support arms 54 is disposed on the helicopter side of the outer frame 14. As seen in FIG. 2, each railway support arm 54 includes first and second elongated portions 60 and 62 pivotally connected to one another via a pivot pin 64. The first elongated portion 60 of each railway wheel support arm 54 is inserted in a pair of vertically aligned brackets (not shown) extending laterally outwardly from the helicopter side of the outer framework 14 and removably secured thereto by means of lock pins (not shown). Each railway wheel support arm 54 further includes a lock pin 66 which can be transversally inserted through the first and second elongated portions 60 and 62 to lock the railway wheel support arm 54 in a straight line configuration.

The second pair of railway support arms 56 are disposed on the opposite side of the outer frame 14. As seen in FIG. 3, each railway support arm 56 includes first and second elongated portions 68 and 70 pivotally connected to one another via a pivot pin 72. Each railway wheel support arm 56 further includes a lock pin 73 which can be transversally inserted through the first and second elongated portions 68 and 70 to lock the railway wheel support arm 56 in a straight line configuration. The first elongated portion 68 of each railway wheel support arm 56 is articulated at the bottom end thereof to the bottom portion of the corresponding corner posts 30 of the outer framework 14 via a universal joint 74, or the like. This allows each railway wheel support arm 56 to be folded down along the side of the outer framework 14 during transportation of the collapsible basket 10 by the helicopter H, as seen in FIGS. 1 and 2. Each railway wheel support arm 56 can be locked in an upstanding position, as seen in FIG. 3, by first pivoting the railway wheel support arm 56 within a U-shaped bracket 76 secured to the top end portion of the associate corner post 30 and by subsequently inserting a lock pin 78 through the U-shaped bracket 76 and the railway wheel support arm 56.

The collapsible basket 10 further includes a pair of front and rear extendable/retractable arms 80 and 82 respectively pivotally mounted to a front bottom extension 84 and a rear bottom extension 86 of the outer framework 14. More specifically, the front extendable/retractable arm 80 is mounted for rotation about a pivot 88 between vertical and horizontal positions, as indicated by arrow 90 in FIGS. 2 and 3. Similarly, the rear extendable/retractable arm 82 is mounted for rotation about a pivot 92 between vertical and horizontal positions, as indicated by arrow 94 in FIGS. 2 and 3. The front and rear extendable/retractable arms 80 and 82 are each attached to one end of a cable 96 which is attached at the other end thereof to the outer framework 14 in order to limit the downward pivot of the front and rear extendable/retractable arms 80 and 82 to 90 degrees to the vertical. The front extendable/retractable arm 80 can be held in its upstanding vertical position by means of a retention arm 98 extending frontwardly from the top frame structure 26 of the outer framework 14 and having at a distal end thereof a U-shaped bracket 100 through which a lock pin 102 may be removably transversally inserted after having pivoted the front extendable/retractable arm 80 upwardly into the U-shaped bracket 102. Similarly, the rear extendable/retractable arm 82 can be held in its upstanding vertical position by means of a retention arm 104 extending rearwardly from the top frame structure 26 of the outer framework 14 and having at a distal end thereof a U-shaped bracket 106 through which a lock pin 108 may be removably transversally inserted after having pivoted the rear extendable/retractable arm 82 upwardly into the U-shaped bracket 106.

The front and rear extendable/retractable arms 80 and 82 are each provided at a respective distal end thereof with an axle 110 at opposed ends of which a pair of wheels 112 are rotatably mounted. As seen in FIG. 2, the wheels 112 are adapted to ride on a given pair of laterally spaced-apart parallel elevated cables C.

As indicated by arrows 114 in FIG. 2, the front and rear extendable/retractable arms 80 and 82 may be extended or retracted to vary the length thereof in order to lower or raise the collapsible basket 10 with respect to the elevated cables C. Furthermore, as depicted in FIGS. 2 and 3, the front and rear extendable/retractable arms 80 and 82 can be rotated as per arrow 116 upon themselves to allow the wheels 110 to be placed on a pair of spaced-apart cables C from below, as will be described hereinafter.

According to a preferred embodiment of the present invention, the extendable/retractable arms 80 and 82 each consist of a hydraulic cylinder having a piston rod equipped with a swivel for allowing the axle 110 connected therewith to be rotated about the piston rod. In this case, a motor 118 can be mounted on the front bottom extension 84 to power the front and rear extendable/retractable arms 80 and 82.

Furthermore, it is noted that the tubular structure of the inner and outer frameworks 12 and 14 can advantageously be used as an oil reservoir.

In operation, the collapsible basket 10, which is in its collapsed position with the second pair of railway wheel arms 56 folded down along one side thereof, is suspended from the support arm A of the helicopter H via the carrying member 50, as illustrated in FIG. 1. Then, the collapsed basket 10 is carried to a length of elevated cables where an operation has to be carried out. The helicopter H approaches the elevated cables C sideways so as to place the horizontal tubular portion 46 of the inverted L-shaped support member 38 above the cables with the collapsed basket 10 underlying the cables C.

Then, the horizontal tubular portion 46 which extends crosswise relative to the subjacent pair of laterally spaced-apart cables C is lowered onto the cables C by the helicopter H. As seen in FIG. 1, a V-shaped guide 120 can be fixed to the undersurface of the horizontal tubular portion 46 of the inverted L-shaped support member 38 to ensure proper positioning of the horizontal tubular portion 46 on the cables C. Once the horizontal tubular portion 46 properly rests on the cables C, the support arm A is lowered by the helicopter H so as to move the support arm A out of engagement with the carrying member 50.

Thereafter, the helicopter H moves sideways away from the cables C so as to withdraw the support arm a from between the carrying member 50. The helicopter H is then brought back down onto the ground and a platform (not shown) is removably mounted to the helicopter H for allowing an operator to take place thereon laterally outwardly of the helicopter H. Once this operation has been completed, the platform is carried laterally adjacent to the suspended basket 10 to allow the operator to place the wheels 112 onto the cables C. This is accomplished by first pivoting the front and rear extendable/retractable arms 80 and 82 to their respective upstanding positions, second rotating the front and rear extendable/retractable arms 80 and 82 as per arrows 116 about their respective longitudinal axes so as to place the axles 110 parallel to the cables C, third extending the extendable/retractable arms 80 and 82 between the cables in order to pass the axles 110 above the cables C, fourth rotating the front and rear extendable/retractable arms 80 and 82 as per arrows 116 about their respective longitudinal axes so that the axles 112 extend transversally of the cables C with the wheels 112 in vertical alignment with the corresponding underlying cables C, and fifth retracting the extendable/retractable arms 80 and 82 to lower the wheels 112 on the cables C.

After the wheels 112 have been positioned on the cables C as described above, the extendable/retractable arms 80 and 82 are further retracted in order to lift the collapsible basket 10 and, thus, raise the horizontal tubular portion 46 of the inverted L-shaped support member 38 above the cables C. In this position the collapsed basket 10 is suspended from the cables via the front and rear extendable/retractable arms 80 and 82, as seen in FIG. 2.

Thereafter, the inverted L-shaped support member 38 is detached from the outer framework 14 and placed on the platform (not shown). The basket 10 is then erected and the operator transferred therein. Subsequently, the second pair of railway wheel support arms 56 are unfolded and secured in their respective upstanding positions. Then, the front and rear extendable/retractable arms 80 and 82 are extended so as to lower the railway wheel 58 onto the cables C. Once this operation has been accomplished, the front and rear extendable/retractable arms 80 and 82 are disengaged from the cables C and placed thereunder in their idle position. At this stage, the basket 10 is suspended from the cables C via the first and second pairs of railway wheel support arms 54 and 56, as illustrated in FIG. 3. The wheels 58 may be motorized to displaced the basket on the cables C. Alternatively, the basket 10 can be manually propelled.

When an obstacle, such as a hardware attached to the cables C is encountered, the front and rear extendable/retractable arms 80 and 82 can be used for traversing the collapsible basket 10 over the obstacle. This is accomplished by first positioning the front wheels 58 as close as possible to the obstacle, second positioning the wheels 112 of the front extendable/retractable arm 80 on the downstream side of the obstacle, third retracting the front extendable/retractable arm 80 so as to lift the front of the basket 10, fourth pivoting the second portions of 62 and 70 of the front railway wheel support arms 56 and 58 outwardly so as to disengage the front wheels 58 from the cables C, fifth advancing the basket 10 on the cables C so as to place the front wheels 58 on the downstream side of the obstacle, sixth pivoting and locking the second portions 62 and 70 of the front railway wheel support members 56 above the cables, seventh retracting the front extendable/retractable arm 80 so as to lower the front wheels 58 onto the cables C, and finally placing the front extendable/retractable back to its idle position. The rear extendable/retractable arm 82 is used in a similar manner to pass the rear wheels 58 on the downstream side of the obstacle.

Finally, the basket 10 can be removed from the cables C by generally following the reversed steps required for installing the same onto the cables C.

What is claimed is:

1. A man basket adapted for attachment to a support arm extending laterally outwardly from a helicopter used to carry the basket to elevated cables or installations, comprising a container structure having a bottom support surface and an open top end for providing access to said bottom support surface, said container structure being displaceable between a collapsed position wherein said container structure has a reduced height and an erected position wherein said container structure has a full height, an overhead basket transport member for suspending said container structure in an upright position from the support arm, said overhead basket transport member including a support member having an upstanding portion connected to one side of said container structure and a horizontal portion extending from said upstanding portion at a distance over said open top end for allowing said container structure to be laterally moved below a length of elevated cables with said horizontal portion of said support member extending above the elevated cables to temporally suspend said man basket therefrom, and a lock for releasably retaining said man basket in said collapsed position thereof while being suspended by said basket transport member, wherein said bottom support surface is mounted to lower by gravity away from said basket transport member upon release of said lock to cause deployment of said man basket to said erected position thereof while the same is still suspended in said upright position.

2. A man basket as defined in claim 1, wherein said container structure comprises top and bottom frame sections telescopically related to one another, said bottom support surface forming part of said bottom frame section, and wherein said top frame structure is suspendable from the support arm by said basket transport member.

3. A man basket as defined in claim 2, wherein said top and bottom frame sections each have a box-like configuration, said top frame section having opposed open top and bottom ends, and wherein said top and bottom frame sections are interfitted in telescopic engagement.

4. A man basket as defined in claim 3, wherein said bottom frame section slides within said top frame section, thereby allowing said bottom frame section to be retracted within said top frame section through said open bottom end thereof.

5. A man basket as defined in claim 4, wherein said open bottom end of said top frame structure is smaller than said open top end thereof.

6. A man basket as defined in claim 5, wherein said top and bottom frame sections are provided with cooperating engagement means for limiting downward movement of said bottom frame section relative to said top frame section.

7. A man basket as defined in claim 6, wherein said cooperating engagement means comprise at least one flange extending outwardly from an upper portion of said bottom frame section for resting engagement with at least one shoulder extending inwardly from a bottom portion of said top frame section.

8. A man basket as defined in claim 4, wherein said lock includes at least one lock member adapted to be displaced between released and secured positions for selectively locking said bottom frame section within said top frame section so that said man basket can be transported in said collapsed position thereof.

9. A man basket as defined in claim 8, wherein said lock member includes a catch pivotally mounted to said upper portion of said bottom frame section for resting engagement with a corresponding resting surface provided at an upper portion of said top frame section.

10. A man basket as defined in claim 1, wherein wheels are provided for supporting said man basket on the elevated cables.

11. A man basket as defined in claim 10, wherein wheel support arms are provided on opposed sides of said basket, said wheel arms being articulated relative to said man basket and each having respective distal end portion adapted to rotatably support a corresponding one of said wheels.

12. A man basket as defined in claim 10, wherein said basket further comprises front and rear lifting arms adapted to suspend the basket from the elevated cables, said front and rear lifting arms being displaceable between retracted and extended positions for selectively moving said wheels into and out of engagement with the elevated cables.

13. A man basket as defined in claim 12, wherein said front and rear lifting arms are articulated relative to said container structure.

14. A man basket adapted for attachment to a support arm extending laterally outwardly from a helicopter, comprising a frame structure having a bottom support surface and a top surface joined together in an axially adjustable relationship, said top surface defining an opening for providing access to said bottom support surface, an overhead basket transport member for suspending said frame structure from the support arm, said overhead basket transport member including a support member having an outstanding portion connected to one side of said frame structure and a horizontal portion extending from said upstanding portion at a distance over said top surface for allowing said frame structure to be laterally moved below a length of elevated cables with said horizontal portion of said support member extending above the elevated cables to temporally suspend said man basket therefrom, said frame structure being displaceable between collapsed and erected positions for selectively reducing and increasing axial dimensions thereof while being suspended from the support arm by said basket transport member, and a lock for releasably retaining said man basket in said collapsed position thereof, wherein said bottom support surface is allowed, upon release of said lock, to lower by gravity to said erected position to cause deployment of said man basket, whereby said man basket can be carried in said collapsed position and, once on site, extended to said erected position for safely receiving at least one operator.

* * * * *